July 23, 1935.  J. L. BERRY  2,009,308
FLEXIBLE PIPE JOINT
Filed Nov. 11, 1933  2 Sheets-Sheet 1
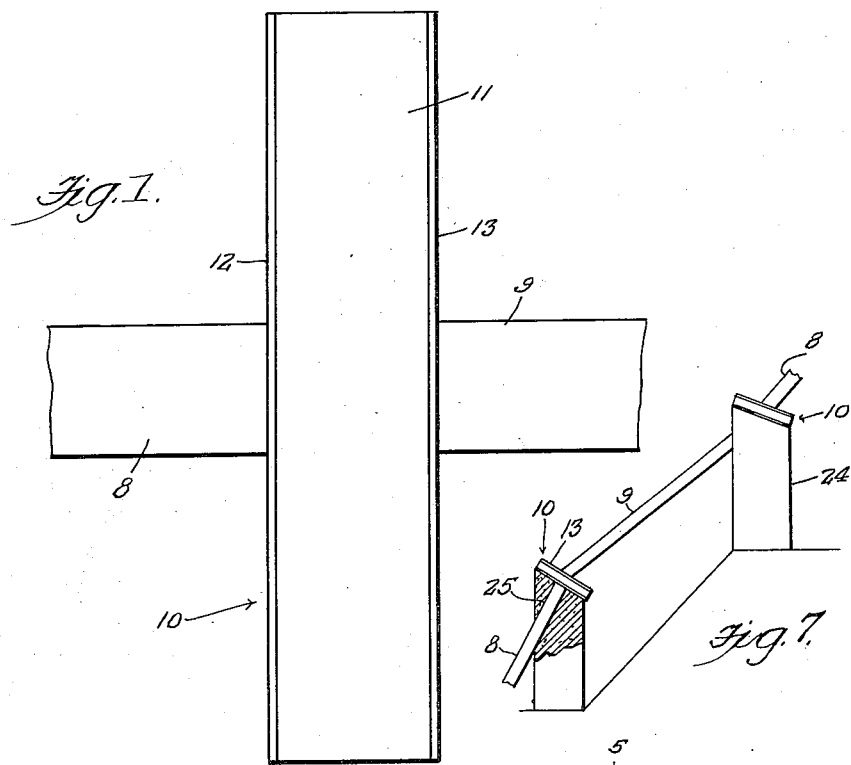
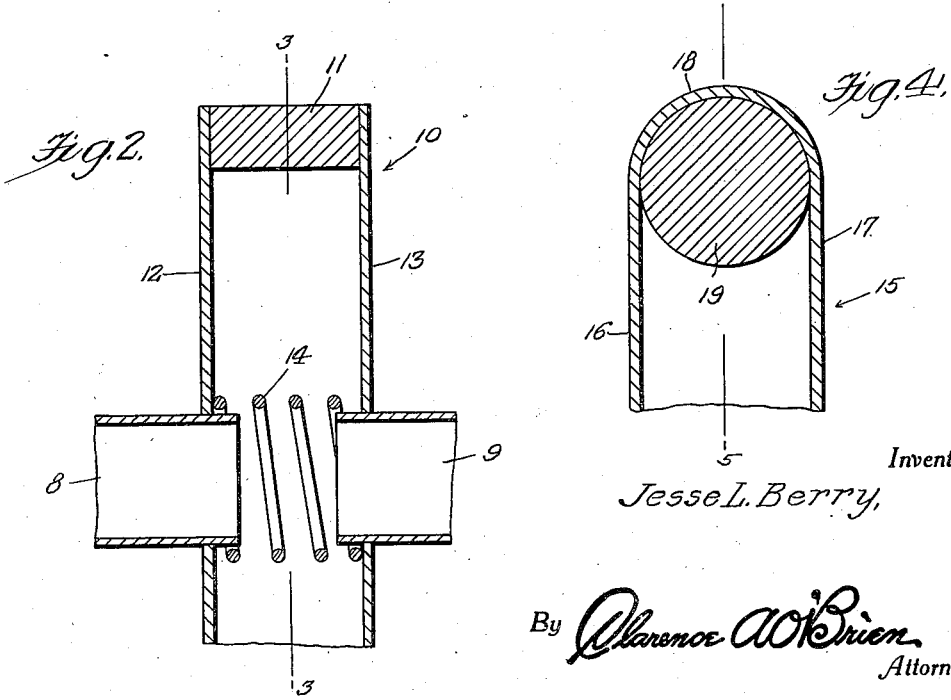
Inventor
Jesse L. Berry,
By Clarence A. O'Brien
Attorney July 23, 1935. J. L. BERRY 2,009,308
FLEXIBLE PIPE JOINT
Filed Nov. 11, 1933 2 Sheets-Sheet 2
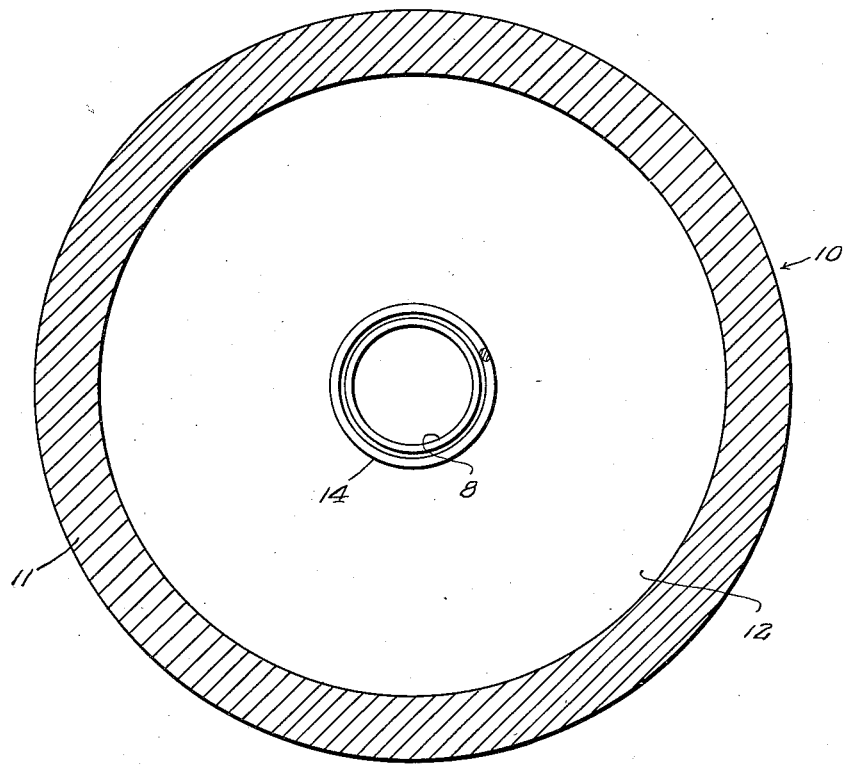
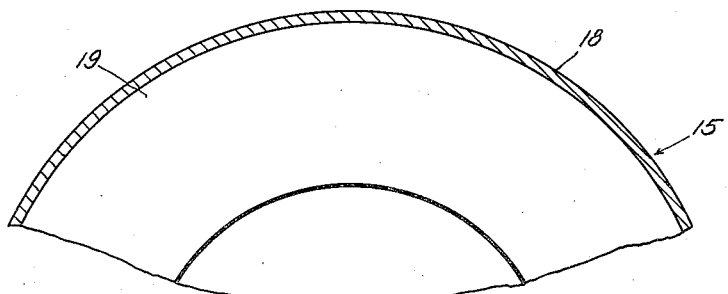
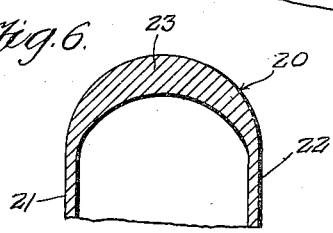
Inventor
Jesse L. Berry,
By Clarence A. O'Brien
Attorney Patented July 23, 1935

2,009,308

UNITED STATES PATENT OFFICE 2,009,308

FLEXIBLE PIPE JOINT

Jesse L. Berry, Los Angeles, Calif.

Application November 11, 1933, Serial No. 697,668

1 Claim. (Cl. 285—90)

This invention relates to improvements in pipe joints and couplings, and it has more specific reference to a novel type pipe joint designed to compensate for longitudinal expansion and contraction of pipe lengths and to serve also to permit automatic relative angling of the pipe sections without disrupting the couplings or pipe sections themselves.

Pipe lines used for conducting water, gas, oil, air or other substances require the incorporation therein of flexible means capable of allowing the pipe sections to expand and contract without damaging the said pipe. I have discovered the need for a special type flexible joint or coupling which permits the requisite longitudinal expansion and contraction of the pipe sections and at the same time permits adequate lateral displacement while at the same time maintaining an effective fluid tight joint.

The particular structural detail employed for accomplishing these results will become more readily apparent from the following description and drawings.

In the accompanying illustrative drawings, wherein like reference characters are employed to designate like reference characters throughout the same:

Figure 1 is an elevational view disclosing a pair of pipe sections joined together through the medium of the improved flexible coupling.

Figure 2 is a sectional view of a fragmentary nature.

Figure 3 is a section taken approximately on the plane of the line 3—3 of Figure 2.

Figure 4 is a view somewhat similar to Figure 2 showing a modification of the invention.

Figure 5 is a detail section taken approximately on the plane of the line 5—5 of Figure 4.

Figure 6 is a view similar to Figures 2 and 4 showing a still further embodiment of the invention.

Figure 7 is a diagrammatic view.

Referring now to Figure 1, it will be observed that the pipe sections, for sake of distinction, are denoted by the numerals 8 and 9, while the coupling, as a unit, is differentiated by the numeral 10. This particular type of coupling comprises a relatively large disc-like casing which as seen in Figure 2 comprises an annular endless relatively heavy rim 11 and a pair of duplicate disc-like plates or heads 12 and 13 in which the pipe ends are welded or otherwise rigidly fastened in approximate longitudinal alinement. Surrounding the protruding inner ends of the pipe section is an expansion coil spring 14, designed to maintain a tension against the inner central portions of the disc-like plates 12 and 13.

The plates 12 and 13 are of flexible steel and are capable of flexing in irregular manners, and likewise capable of movement toward and from each other to compensate for longitudinal expansion and contraction of the pipe sections. Obviously when the pipe sections expand, the central portions of the discs are concaved inwardly and when the tension on the discs is released as the pipe section contracts again in normal position, the spring 14 operates to separate and return the discs to their normal spaced parallel position.

In Figure 4, the embodiment of the invention follows the same principle of construction, the coupling being here designated generally by the numeral 15 and being formed of single castings having its disc-portions 16 and 17 formed integral with the transversely curved rim 18. In this arrangement I provide an inner reinforcing ring 19 designed for shape maintenance and rigidity of structure.

In the remaining embodiment of the invention seen in Figure 6, the body or casing of the coupling is denoted by the numeral 20, and comprises opposed parallel flexible discs 21 and 22 integrally joined together by a transversely curved, but thickened rim 23. Fundamentally the idea is that the rim must be sufficiently rigid to maintain a constant shape and to avoid distortion while the opposed disc portions must be sufficiently flexible to take care of the longitudinal expansion and contraction as well as the lateral angling of the pipe sections.

For sake of illustration of the method of use of the invention, attention is invited to the somewhat diagrammatic illustration given in Figure 7, which is intended to show how the piping is supported in spaced relation by the irregular gradually elevating surface of the ground, such as for example in a mountainous region. In this connection the numerals 24 designate concrete blocks or posts of appropriate dimension whose upper ends are generally bevelled and provided with notches 25 forming seats for the adjacent portions of the pipe sections.

The bevelled upper ends of the posts serve as supports for the coupling units 10. Otherwise stated, the coupling units rest directly on the bevelled upper ends of the posts in order to attach and support the pipe line to prevent displacement thereof. Hence the pipe couplings have the additional function of supporting means and due to the inherent resiliency of the disc-like head with which they are provided, they compensate for the stress and strain to which they are subjected, owing to the peculiar angling of the relative pipe sections of the complete pipe line.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

A flexible pipe coupling comprising a circular casing including a rigid rim and a pair of normally parallel end members, each end member being of thin material to make the member flexible and each end member being of the same thickness throughout and having a centrally arranged hole therein of a length equal to the thickness of the member, pipes having their adjacent ends extending through the holes and welded to the walls of said holes, each end member being of much greater diameter than the diameter of the pipe engaged thereby, the pipes extending into the casing, and a spring extending across the casing and having its ends surrounding the ends of the pipes and bearing against the inner faces of said end members.

JESSE L. BERRY.